United States Patent
Sugiyama

(10) Patent No.: US 11,114,832 B2
(45) Date of Patent: Sep. 7, 2021

(54) WIRING MEMBER FIXING BODY

(71) Applicant: Yazaki Corporation, Tokyo (JP)

(72) Inventor: Nobuhiro Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/919,195

(22) Filed: Jul. 2, 2020

(65) Prior Publication Data

US 2021/0006057 A1 Jan. 7, 2021

(30) Foreign Application Priority Data

Jul. 5, 2019 (JP) .............................. JP2019-125677

(51) Int. Cl.
*H02G 3/30* (2006.01)
*B60R 16/02* (2006.01)
*F16L 3/08* (2006.01)
*H02G 3/38* (2006.01)

(52) U.S. Cl.
CPC ........... *H02G 3/30* (2013.01); *B60R 16/0215* (2013.01); *F16L 3/08* (2013.01); *H02G 3/38* (2013.01)

(58) Field of Classification Search
CPC ... H01R 4/02; H01R 9/07; H02G 3/30; H02G 3/38
USPC ............ 174/74 R, 84 R, 88 R; 439/492, 494, 439/498, 499
See application file for complete search history.

(56) References Cited

U.S. PATENT DOCUMENTS

| 5,780,774 | A  | * | 7/1998 | Ichikawa | H01R 12/61 174/117 FF |
| 5,944,553 | A  | * | 8/1999 | Yasui | H01R 12/78 439/495 |
| 6,376,773 | B1 | * | 4/2002 | Maegawa | H01R 12/63 174/117 F |
| 8,653,372 | B2 | * | 2/2014 | Muneyasu | H01B 7/0045 174/110 R |
| 2018/0109040 | A1 | * | 4/2018 | Iizuka | B60R 16/0207 |
| 2019/0143912 | A1 |   | 5/2019 | Schwiderski |  |

FOREIGN PATENT DOCUMENTS

| JP | 2005-160273 A |   | 6/2005 |          |
|----|---------------|---|--------|----------|
| JP | 2007-28872 A  |   | 2/2007 |          |
| JP | 2011-103715 A |   | 5/2011 |          |
| JP | 2005160273 A  | * | 6/2016 | ............... H02G 3/30 |

\* cited by examiner

*Primary Examiner* — William H. Mayo, III
(74) *Attorney, Agent, or Firm* — Kenealy Vaidya LLP

(57) ABSTRACT

A wiring member fixing body includes a first housing space portion that houses a part in a wiring direction of at least one flat wiring member, a second housing space portion that is formed adjacent to the first housing space portion and houses at least one or more round wiring members having a sectional shape different from a sectional shape of a cross section of the flat wiring member, and a first housing member and a second housing member that form, in a locked state in which the first housing member and the second housing member are disposed to be opposed in an opposing direction and are locked to each other, the first housing space portion and the second housing space portion along an orthogonal direction. Both the ends in the wiring direction of the first housing space portion and the second housing space portion communicate with the outside.

12 Claims, 4 Drawing Sheets

WIRING MEMBER FIXING BODY

CROSS-REFERENCE TO RELATED APPLICATION(S)

The present application claims priority to and incorporates by reference the entire contents of Japanese Patent Application No. 2019-125677 filed in Japan on Jul. 5, 2019.

BACKGROUND OF THE INVENTION

1. Field of the Invention

The present invention relates to a wiring member fixing body.

2. Description of the Related Art

There has been proposed a busbar fixing device that holds two busbars in a stacked state and fixes the busbars to a vehicle side (see, for example, JP 2005-160273 A).

There has been proposed a flat cable binding holder capable of stacking and binding flat cables without deforming the flat cables (see, for example, JP 2007-28872 A).

There has been proposed a flexible flat circuit body binder that prevents respective positional deviations in the width direction and the length direction between stacked flexible flat circuit bodies and prevents disorder of a stacked state from occurring in a flexible flat circuit body bundle (see, for example, JP 2011-103715 A).

Incidentally, a fixing device that holds only busbars and a binding holder that fixes only a plurality of flat cables have been proposed. However, there are needs for not only holding the busbars but also holding electric wires and cables together with the busbars.

SUMMARY OF THE INVENTION

An object of the present invention is to provide a wiring member fixing body that can hold a flat wiring member and other wiring members having sectional shapes different from the sectional shape of the flat wiring member.

In order to achieve the above mentioned object, a wiring member fixing body according to one aspect of the present invention includes a first housing space portion that houses a part in a wiring direction of at least one flat wiring member; a second housing space portion that is formed adjacent to the first housing space portion and houses at least one or more other wiring members having a sectional shape different from a sectional shape of a cross section orthogonal to an axial direction of the flat wiring member; and a first housing member and a second housing member that form, in a locked state in which the first housing member and the second housing member are disposed to be opposed in an opposing direction orthogonal to the wiring direction and are locked to each other, the first housing space portion and the second housing space portion along an orthogonal direction orthogonal to the wiring direction and the opposing direction, wherein both ends in the wiring direction of the first housing space portion and the second housing space portion communicate with an outside.

According to another aspect of the present invention, in the wiring member fixing body, it is possible to configure that at least a pair of the second housing space portions is formed across the first housing space portion in the orthogonal direction.

According to still another aspect of the present invention, in the wiring member fixing body, it is possible to configure that the first housing member and the second housing member are coupled via a hinge portion, and the hinge portion is deformed in the locked state.

According to still another aspect of the present invention, in the wiring member fixing body, it is possible to configure that the first housing member and the second housing member include opposed surfaces in the opposing direction, and the second housing space portion is formed by a concave groove portion formed on the opposed surface of one of the first housing member and the second housing member, a bottom portion of the concave groove portion being formed to be separated in the opposing direction from one of the opposed surfaces, and the other of the opposed surfaces that closes the concave groove portion in the opposing direction of the concave groove portion in the locked state.

According to still another aspect of the present invention, in the wiring member fixing body, it is possible to configure that one of the first housing member and the second housing member includes a restricting portion that presses the flat wiring member in the locked state and restricts movement in the opposing direction.

According to still another aspect of the present invention, in the wiring member fixing body, it is possible to configure that one of the first housing member and the second housing member includes a locking portion that can be locked to an external locking target.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a wiring member fixing body according to the present invention is explained in detail below with reference to the drawings. Note that the present invention is not limited by the embodiment explained below. Components in the embodiment include components replaceable and easily conceived by those skilled in the art or components substantially the same as the components.

Embodiment

Figure 1:
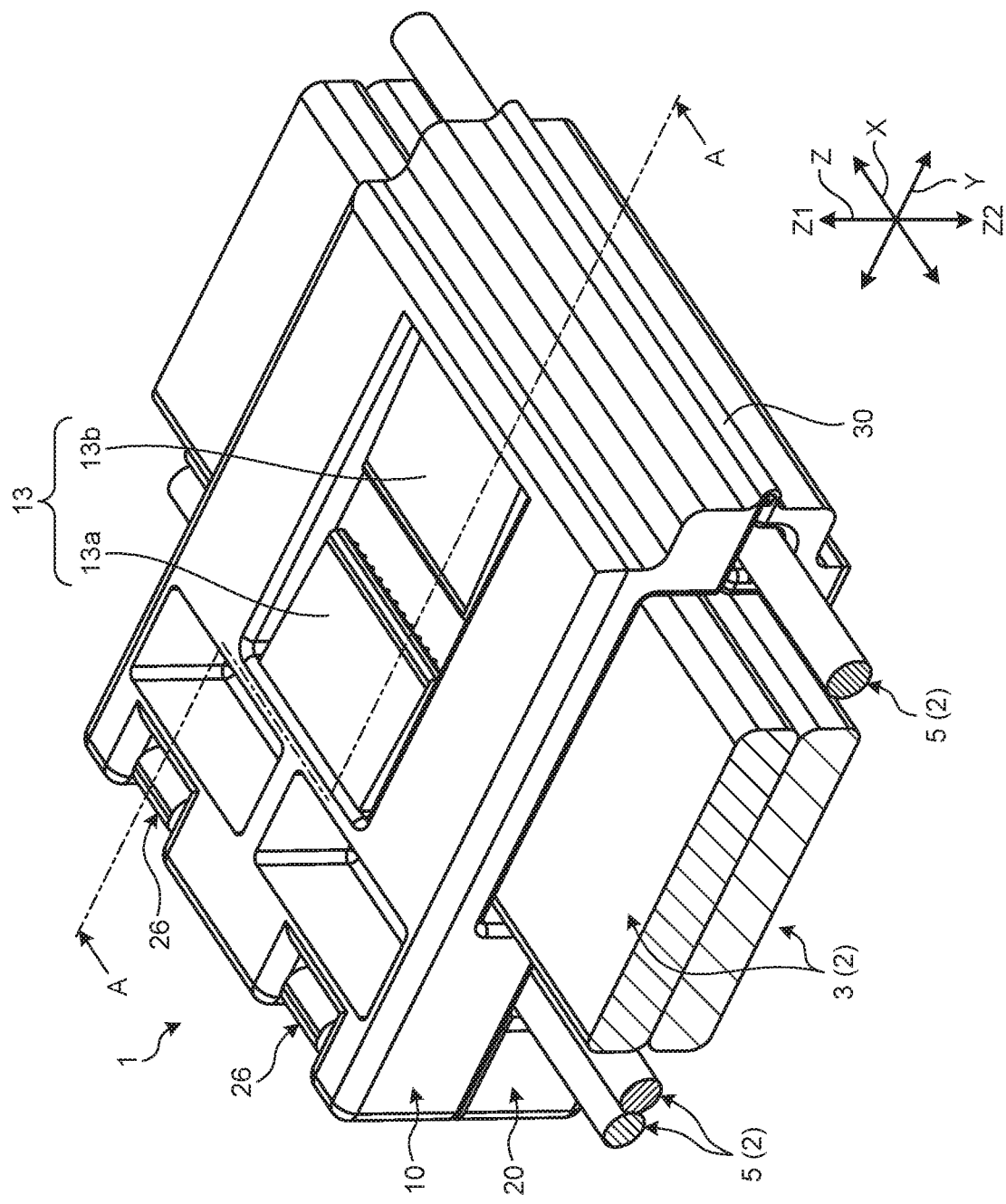
FIG. 1 is a perspective view illustrating a schematic configuration of a wiring member fixing body in an embodiment.
Figure 2:
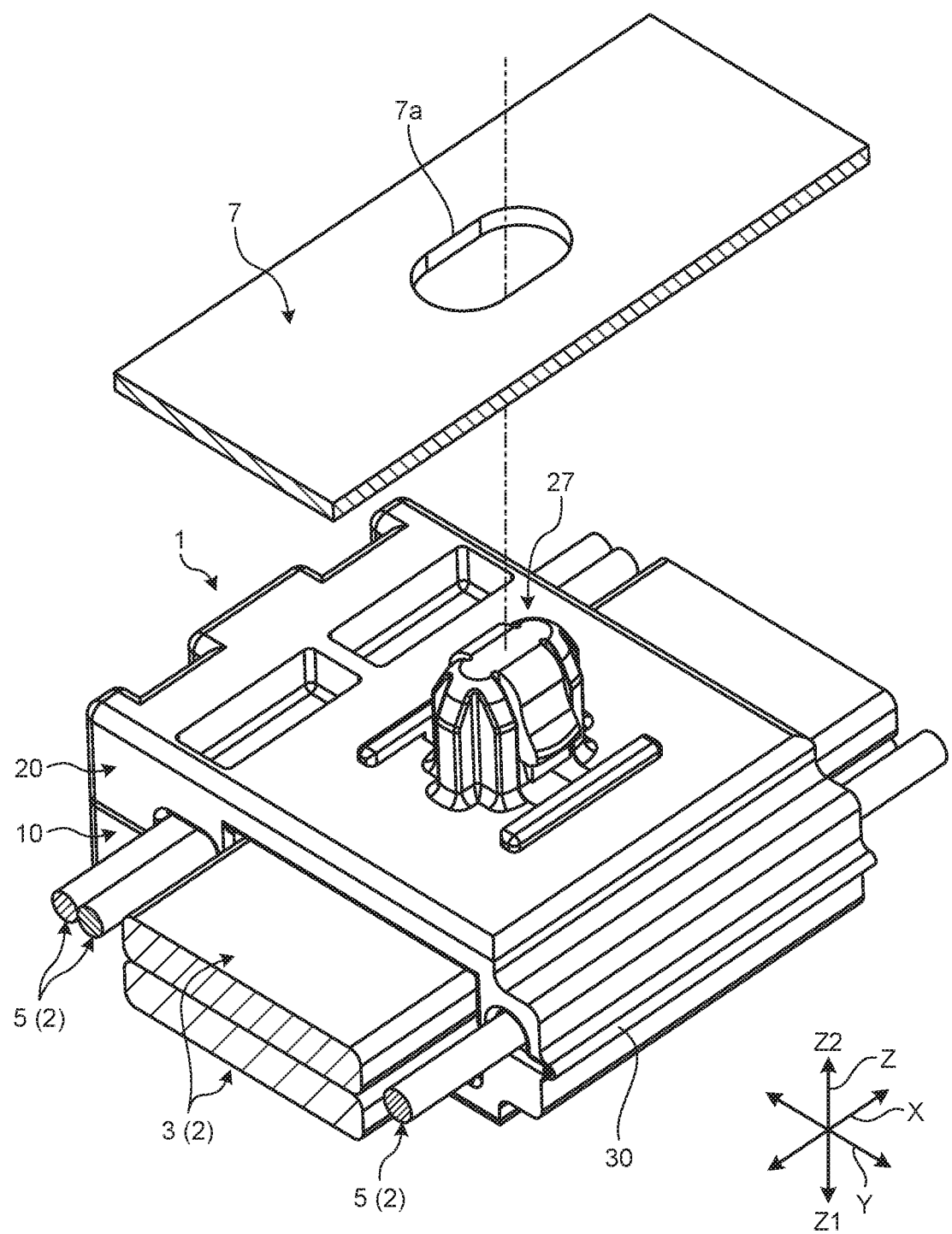
FIG. 2 is a perspective view illustrating the schematic configuration of the wiring member fixing body in the embodiment.
Figure 3:
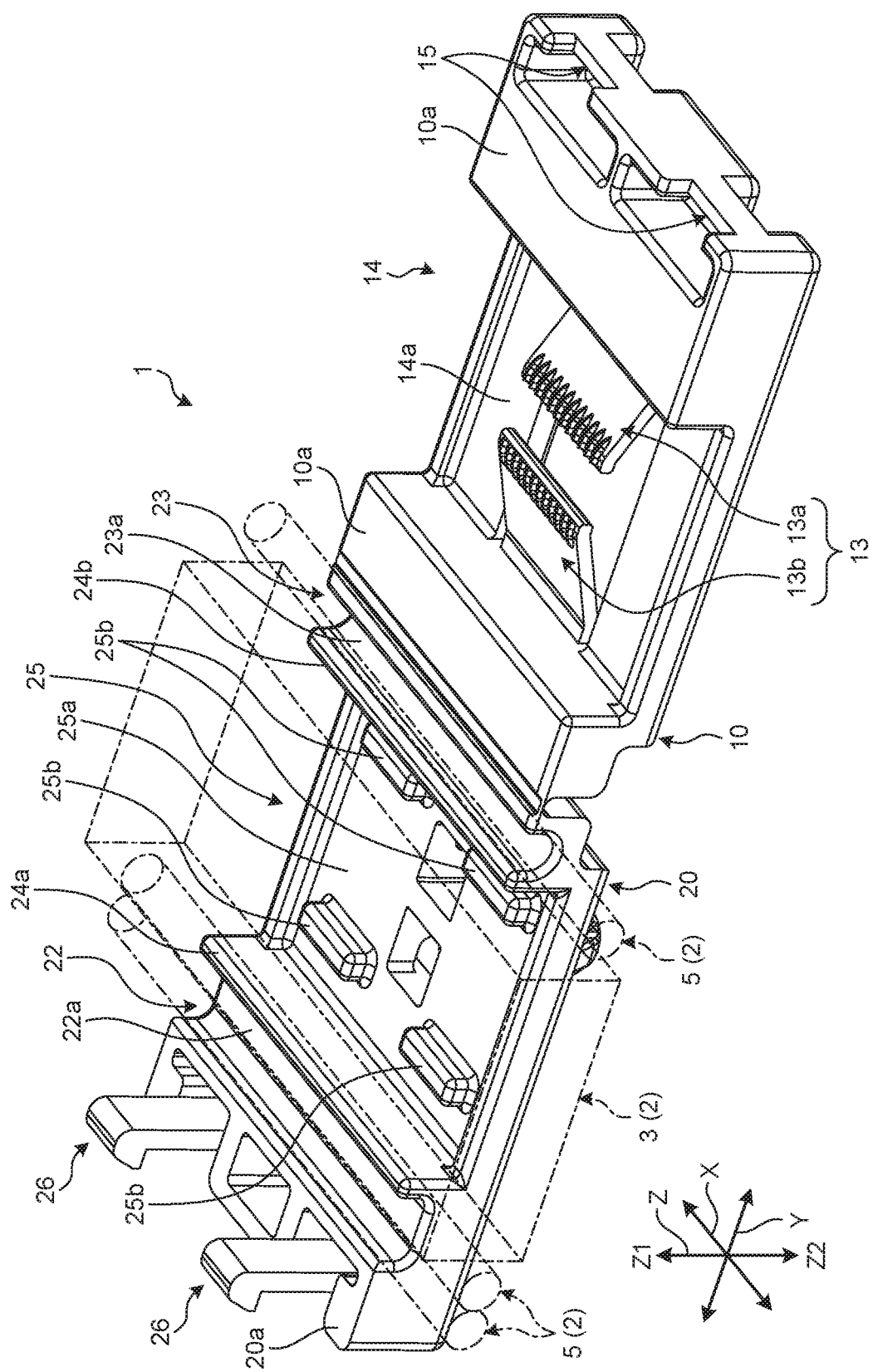
FIG. 3 is a perspective view illustrating the schematic configuration of the wiring member fixing body in the embodiment.
Figure 4:
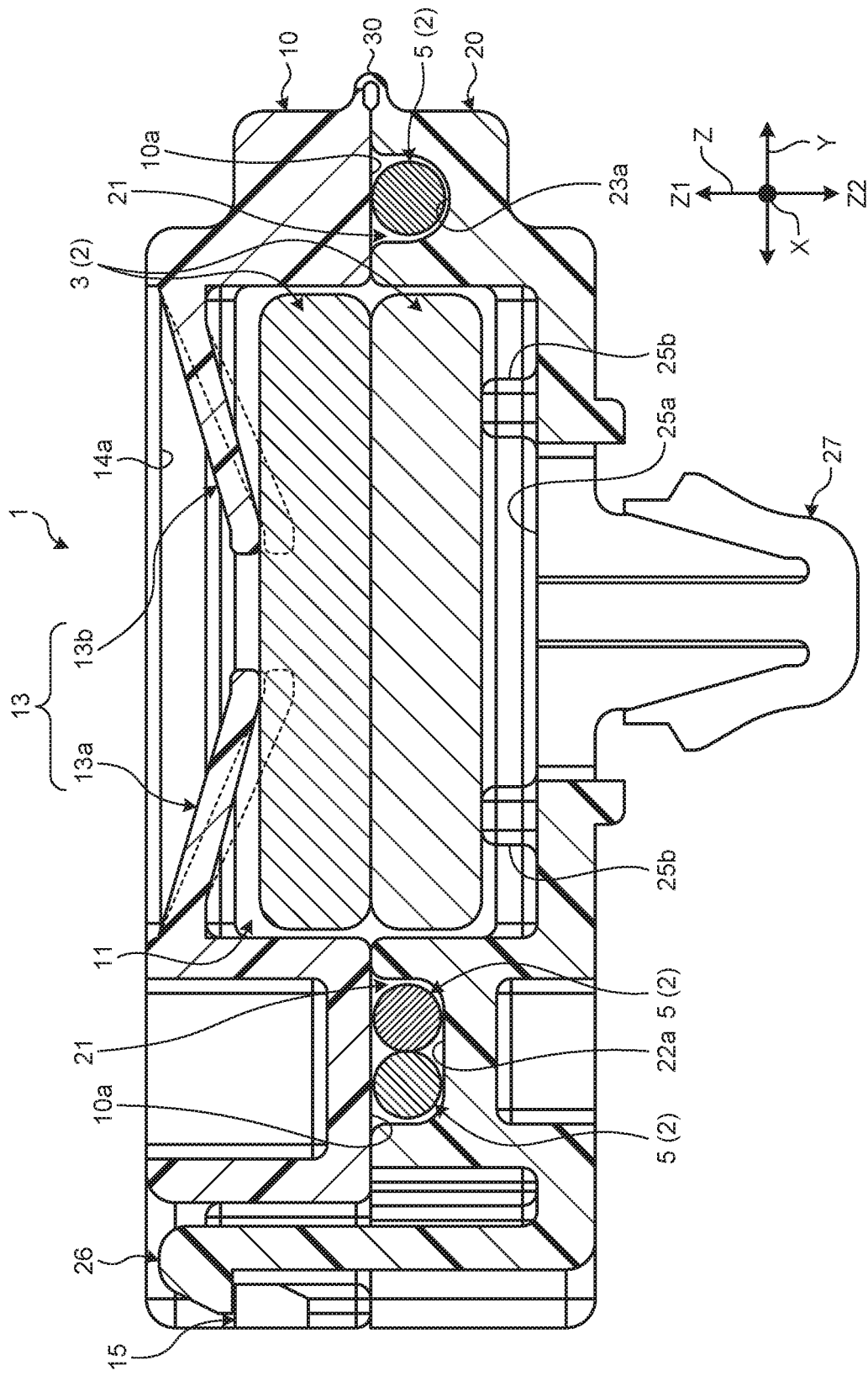
FIG. 4 is a sectional view illustrating the schematic configuration of the wiring member fixing body in the embodiment.

FIG. 1 to FIG. 3 are perspective views illustrating a schematic configuration of a wiring member fixing body in an embodiment. FIG. 4 is a sectional view illustrating the schematic configuration of the wiring member fixing body in the embodiment. Note that FIG. 1 is an oblique top perspective view of a wiring member fixing body that holds a plurality of wiring members. FIG. 2 is an oblique bottom perspective view of the wiring member fixing body before being locked to a vehicle body of a vehicle. FIG. 3 is an oblique top perspective view of the wiring member fixing body in an open state. FIG. 4 is an offset sectional view taken along A-A in FIG. 1.

Note that it is assumed that an X direction illustrated in the figures is the depth direction of a wiring member fixing body 1 or a wiring direction of a wiring member in this embodiment. It is assumed that a Y direction is the width direction of the wiring member fixing body or an orthogonal direction orthogonal to the wiring direction of the wiring member in this embodiment. The Y direction is a direction orthogonal to the X direction. It is assumed that a Z direction is an up-down direction of the wiring member fixing body or an opposing direction orthogonal to the wiring direction of the wiring member in this embodiment. The Z direction is a direction orthogonal to the X direction and the Y direction. In the Z direction, it is assumed that a Z1 direction is an upward direction and a Z2 direction is a downward direction.

The wiring member fixing body 1 illustrated in FIG. 1 to FIG. 4 is, for example, a clamp capable of holding a part in a wiring direction of a wiring member 2 used in a vehicle (not illustrated) such as an automobile and fixing the part to a vehicle body or the like in the vehicle. The wiring member 2 includes, for example, a busbar, an electric wire, and a cable. That is, the wiring member fixing body 1 can hold a plurality of kinds of wiring members 2. The wiring member fixing body 1 in this embodiment can hold a flat wiring member 3 and a round wiring member 5 having a sectional shape different from the sectional shape of the flat wiring member 3.

The flat wiring member 3 is a wiring member including a conductor extending in an axial direction, a sectional shape of a cross section of the wiring member orthogonal to the axial direction being a rectangular shape. The flat wiring member 3 is, for example, a busbar or an extrusion wiring member. The flat wiring member 3 in this embodiment is a coated busbar, the outer circumferential surface of which is coated with an insulating coat.

The round wiring member 5 is a wiring member including a conductor extending in the axial direction, a sectional shape of a cross section of the wiring member orthogonal to the axial direction being a circular shape. The round wiring member 5 includes, for example, a coated electric wire and a shielded communication cable. The round wiring member 5 in this embodiment is a coated electric wire, the outer circumferential surface of which is coated with an insulating coat. Therefore, as the round wiring member 5, as illustrated in FIG. 1, FIG. 2, and FIG. 4, one round wiring member 5 can be independently used or two round wiring members 5 can be used adjacent to each other. As illustrated in FIG. 1 and FIG. 2, the wiring member fixing body 1 in this embodiment can hold, for example, two round wiring members 5 arrayed adjacent to each other.

The wiring member fixing body 1 includes a locking protrusion 27 as illustrated in FIG. 2. The locking protrusion 27 is a locking portion that can be locked to a locking target on the outside of the wiring member fixing body 1. As illustrated in FIG. 2, the locking protrusion 27 in this embodiment is locked to, for example, a locking hole 7a of a vehicle body 7. The wiring member fixing body 1 in this embodiment includes a first housing space portion 11, a second housing space portion 21, a first housing member 10, and a second housing member 20.

The first housing space portion 11 houses a part in the wiring direction of the flat wiring member 3. As illustrated in FIG. 1, FIG. 2, and FIG. 4, the first housing space portion 11 in this embodiment houses a part in the wiring direction of stacked two flat wiring members 3. The first housing space portion 11 extends in the wiring direction. Both ends in the wiring direction of the first housing space portion 11 communicate with the outside.

The second housing space portion 21 is formed adjacent to the first housing space portion 11 and houses two round wiring members 5 having a sectional shape different from a sectional shape of a cross section orthogonal to the flat wiring member 3. The second housing space portion 21 extends in the wiring direction. Both ends in the wiring direction of the second housing space portion 21 communicate with the outside. Two second housing space portions 21 are formed across the first housing space portion 11 in the orthogonal direction. In this embodiment, one of the two second housing space portions 21 houses two round wiring members 5 and the other houses one round wiring member 5. The second housing space portion 21 in this embodiment is formed by concave groove portions 22 and 23 and an opposed surface 10a. The concave groove portion 22 is formed on an opposed surface 20a of the first housing member 10. A bottom portion 22a of the concave groove portion 22 is formed to be separated in the opposing direction from one opposed surface 10a. The concave groove portion 23 is formed on the opposed surface 20a of the first housing member 10. A bottom portion 23a of the concave groove portion 23 is formed to be separated in the opposing direction from one opposed surface 10a. In a locked state in which the first housing member 10 and the second housing member 20 are disposed to be opposed in the opposing direction and locked to each other, the second housing space portion 21 is formed by the concave groove portions 22 and 23 and the other opposed surface 10a that closes the concave groove portions 22 and 23 in the opposing direction of the concave groove portions 22 and 23.

In the locked state in which the first housing member 10 and the second housing member 20 are disposed to be opposed in the opposing direction orthogonal to the wiring direction and locked to each other, the first housing member 10 and the second housing member 20 form the first housing space portion 11 and the second housing space portion 21 along the orthogonal direction orthogonal to the wiring direction and the opposing direction. The first housing member 10 and the second housing member 20 are coupled via a hinge portion 30. The hinge portion 30 couples one end portion in the width direction of the first housing member 10 and the other end portion in the width direction of the second housing member 20. The hinge portion 30 is formed in a plate shape and configured such that the first housing member 10 and the second housing member 20 are deformed in the locked state. The first housing member 10, the second housing member 20, and the hinge portion 30 are made of, for example, synthetic resin easily machined, having insulation, oil resistance, and water resistance, and elastically deformable and are integrally molded.

The first housing member 10 includes the opposed surface 10a on the second housing member 20 side in the opposing direction in the locked state. The first housing member 10 includes a concave groove portion 14, a restricting portion 13, and lock receiving portions 15.

The concave groove portion 14 is a portion that forms a part of the first housing space portion 11 in the locked state.

The concave groove portion 14 is formed to extend in the wiring direction. Both ends in the wiring direction of the concave groove portion 14 are opened. The concave groove portion 14 includes a bottom portion 14a.

The restricting portion 13 presses the flat wiring member 3 and restricts movement in the opposing direction in the locked state. The restricting portion 13 in this embodiment includes two plate pieces 13a and 13b. As illustrated in FIG. 3, the plate pieces 13a and 13b are formed in the bottom portion 14a of the concave groove portion 14. The plate pieces 13a and 13b are opposed to in the width direction of the wiring member fixing body 1 and disposed to be separated from each other. As illustrated in FIG. 4, the plate pieces 13a and 13b are inclined at a fixed inclination angle from the bottom portion 14a toward the inner side. The plate pieces 13a and 13b are configured to be elastically deformable. In the locked state, end portions of the plate pieces 13a and 13b in a stacking direction (the opposing direction) of the flat wiring member 3 come into contact with the flat wiring member 3 to be elastically deformed. For example, end portions of the plate pieces 13a and 13b in contact with the flat wiring member 3 are formed in a saw teeth shape and suppresses movement in the wiring direction of the flat wiring member 3 in the locked state.

The lock receiving portions 15 are portions that are formed at the other end portion in the width direction of the first housing member 10 and to which locking claws 26 are locked in the locked state. The lock receiving portions 15 are formed at an interval in the depth direction.

The second housing member 20 includes the opposed surface 20a on the first housing member 10 side in the opposing direction in the locked state. The opposed surface 20a is opposed to the opposed surface 10a in the locked state. The second housing member 20 includes a plurality of concave groove portions 22, 23, and 25 and the locking claws 26.

The concave groove portion 25 is a portion that forms a part of the first housing space portion 11 in the locked state. The concave groove portion 25 is formed to extend in the wiring direction. Both ends in the wiring direction of the concave groove portion 25 are opened. The concave groove portion 25 includes a bottom portion 25a. The bottom portion 25a is opposed to the bottom portion 14a in the opposing direction. In the bottom portion 25a, four protrusions 25b are formed. The protrusions 25b are in contact with the flat wiring member 3 in the opposing direction in the locked state. The protrusions 25b are portions that support the flat wiring member 3 in the locked state. The concave groove portion 25 is formed adjacent to the concave groove portions 22 and 23 via partition walls 24a and 24b.

Work for fixing the flat wiring member 3 and the round wiring members 5 to the vehicle body 7 using the wiring member fixing body 1 is explained.

First, an operator places stacked two flat wiring members 3 in the concave groove portion 25 in a state in which the first housing member 10 and the second housing member 20 are opened (FIG. 3). Subsequently, the operator places two round wiring members 5 in the concave groove portion 22 and places one round wiring member 5 in the concave groove portion 23. Subsequently, the operator closes the first housing member 10 in a state in which the second housing member 20 is fixed and locks the locking claws 26 to the lock receiving portions 15. The operator locks the locking protrusion 27 in the wiring member fixing body 1 to the locking hole 7a of the vehicle body 7. The wiring member fixing body 1 is capable of moving in the wiring direction of the wiring member 2 in the locked state in which the wiring members 2 are housed respectively in the first housing space portion 11 and the second housing space portion 21. Therefore, even in a state in which the flat wiring member 3 generally having low flexibility is held, the wiring member fixing body 1 can be moved in the wiring direction. Therefore, even if the locking protrusion 27 positionally deviates with respect to the locking hole 7a during assembly, it is possible to easily perform position correction.

As explained above, the wiring member fixing body 1 in this embodiment includes the first housing space portion 11 that houses a part in the wiring direction of the flat wiring member 3 and the two second housing space portions 21 that are formed adjacent to the first housing space portion 11 and house a part in the wiring direction of a plurality of round wiring members 5 having a sectional shape different from the sectional shape of the flat wiring member 3. The wiring member fixing body 1 includes the first housing member 10 and the second housing member 20 that are disposed to be opposed in the opposing direction and form the first housing space portion 11 and the second housing space portion 21 along the orthogonal direction in the locked state. Both the ends in the wiring direction of the first housing space portion 11 and the second housing space portion 21 communicate with the outside.

With the configuration explained above, a plurality of kinds of wiring members can be collectively held and fixed. Therefore, it is unnecessary to provide an exclusive clamp according to a kind of the wiring member 2. It is possible to reduce the number of components. Cost can be reduced according to the reduction in the number of components. Since a plurality of clamps are unnecessary according to kinds of the wiring member 2, it is possible to achieve saving of a space in which the wiring member 2 is wired.

In the wiring member fixing body 1 in the embodiment, the two second housing space portions 21 are formed across the first housing space portion 11 in the orthogonal direction. Since the flat wiring member 3 is mainly used for an electric wire, when a ground plane is present, occurrence of noise is small. On the other hand, when the round wiring members 5 are metal cables for communication, since the round wiring members 5 are easily affected by noise, the round wiring members 5 need to be separated from each other and wired. Therefore, for example, by housing the metal cables respectively in the two second housing space portions 21 formed across the first housing space portion 11, it is possible to perform wiring not easily affected by noise. It is possible to form two systems of electric wires and cables. Redundancy can be imparted to the electric wires and the cables. In the wiring member fixing body 1, since a plurality of second housing space portions 21 are formed, for example, an optical fiber cable can be housed in one second housing space portion 21 and a metal cable can be housed in the other second housing space portion 21. It is possible to properly use the wiring member fixing body 1 according to a use.

In the wiring member fixing body 1 in the embodiment, the first housing member 10 and the second housing member 20 are coupled via the hinge portion 30. Consequently, during assembly work for the wiring member 2, the first housing member 10 and the second housing member 20 can be easily managed as one set. Deterioration in workability due to a component loss or the like can be suppressed. In the wiring member fixing body 1, since the hinge portion 30 is deformed in the locked state, the first housing member 10 and the second housing member 20 can be easily brought into a closed state. The first housing member 10, the second housing member 20, and the hinge portion 30 can be made of the same material rather than different materials. Therefore, a manufacturing process can be simplified and a cost reduction can be achieved.

In the wiring member fixing body 1 in the embodiment, the second housing space portion 21 is formed by the concave groove portions 22 and 23 that are formed on the opposed surface 20*a* and in which the bottom portions 22*a* and 23*a* are formed to be separated in the opposing direction from one opposed surface 10*a* and the other opposed surface 10*a* that closes the concave groove portions 22 and 23 in the opposing direction of the concave groove portions 22 and 23 in the locked state. Consequently, when the round wiring members 5 are assembled to the wiring member fixing body 1, movement can be restricted by inserting the round wiring members 5 into the concave groove portions 22 and 23. Pinching can be prevented when the first housing member 10 and the second housing member 20 are brought into the closed state.

In the wiring member fixing body 1 in the embodiment, the first housing member 10 includes the restricting portion 13 that presses the flat wiring member 3 and restricts the movement in the opposing direction in the locked state. Consequently, the stacked flat wiring member 3 can be held by a proper pressing force. By changing an attachment angle of the plate pieces 13*a* and 13*b* in the restricting portion 13, a pressing force against the stacked flat wiring member 3 can be changed. Even if the number of stacked flat wiring members 3 increases or decreases, it is possible to easily cope with the increase or the decrease.

In the wiring member fixing body 1 in the embodiment, the second housing member 20 includes the locking protrusion 27 that can be locked to the vehicle body 7, which is an external locking target. Consequently, for example, it is possible to reduce the number of components compared with a method in the past for fixing the wiring member fixing body 1 with stud bolts and the like. Further, it is possible to achieve space saving.

Note that, in the embodiment, the sectional shape of the cross section orthogonal to the axial direction of the round wiring member 5 has the circular shape. However, the sectional shape is not limited to this and may be an elliptical shape or may be a quadrangle shape (a square).

In the embodiment, the flat wiring member 3 is the coated busbar, the outer circumferential surface of which is coated with the insulating coat. However, the flat wiring member 3 is not limited to this. The flat wiring member 3 may be, for example, an uncoated busbar. When the uncoated busbar is stacked, it is preferable that a tabular member having insulation is interposed between stacked busbars.

In the embodiment, the restricting portion 13 is formed in the first housing member 10. However, the restricting portion 13 is not limited to this and may be formed in the second housing member 20.

In the embodiment, the first housing space portion 11 houses the two flat wiring members 3. However, the first housing space portion 11 is not limited to this and may house one or two or more flat wiring members 3.

In the embodiment, the first housing member 10 and the second housing member 20 are coupled via the hinge portion 30. However, the first housing member 10 and the second housing member 20 are not limited to this and may be configured to be separated from each other.

In the embodiment, the two second housing space portions 21 are formed across the first housing space portion 11 in the orthogonal direction. However, the second housing space portion 21 is not limited to this. For example, the second housing space portion 21 may be formed on one side or the other side in the orthogonal direction centering on the first housing space portion 11.

In the embodiment, the concave groove portion 25 is formed adjacent to the concave groove portions 22 and 23 via the partition walls 24*a* and 24*b*. However, the concave groove portion 25 is not limited to this. One or more of the partition walls 24*a* and 24*b* may be omitted. In this case, it is preferable that the flat wiring member 3 and the round wiring member 5 are respectively coated.

The wiring member fixing body according to the present embodiment achieves an effect that it is possible to hold a flat wiring member and other wiring members having sectional shapes different from the sectional shape of the flat wiring member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wiring member fixing body comprising:
   a first housing space portion that houses a part in a wiring direction of at least one flat wiring member;
   a second housing space portion that is formed adjacent to the first housing space portion and houses at least one or more other wiring members having a sectional shape different from a sectional shape of a cross section orthogonal to an axial direction of the flat wiring member; and
   a first housing member and a second housing member that form, in a locked state in which the first housing member and the second housing member are disposed to be opposed in an opposing direction orthogonal to the wiring direction and are locked to each other, the first housing space portion and the second housing space portion along an orthogonal direction orthogonal to the wiring direction and the opposing direction, wherein
   both ends in the wiring direction of the first housing space portion and the second housing space portion communicate with an outside, and
   from the second housing space portion, at least one another second housing space portion is formed across the first housing space portion in the orthogonal direction.

2. The wiring member fixing body according to claim 1, wherein
   the first housing member and the second housing member are coupled via a hinge portion, and
   the hinge portion is deformed in the locked state.

3. The wiring member fixing body according to claim 2, wherein
   the first housing member and the second housing member include opposed surfaces in the opposing direction, and
   the second housing space portion is
   formed by
   a concave groove portion formed on the opposed surface of one of the first housing member and the second housing member, a bottom portion of the concave groove portion being formed to be separated in the opposing direction from one of the opposed surfaces, and
   the other of the opposed surfaces that closes the concave groove portion in the opposing direction of the concave groove portion in the locked state.

4. The wiring member fixing body according to claim 2, wherein
one of the first housing member and the second housing member includes a restricting portion that presses the flat wiring member in the locked state and restricts movement in the opposing direction.

5. The wiring member fixing body according to claim 2, wherein
one of the first housing member and the second housing member includes a locking portion that can be locked to an external locking target.

6. The wiring member fixing body according to of claim 1, wherein
the first housing member and the second housing member include opposed surfaces in the opposing direction, and
the second housing space portion is
formed by
a concave groove portion formed on the opposed surface of one of the first housing member and the second housing member, a bottom portion of the concave groove portion being formed to be separated in the opposing direction from one of the opposed surfaces, and
the other of the opposed surfaces that closes the concave groove portion in the opposing direction of the concave groove portion in the locked state.

7. The wiring member fixing body according to claim 6, wherein
one of the first housing member and the second housing member includes a restricting portion that presses the flat wiring member in the locked state and restricts movement in the opposing direction.

8. The wiring member fixing body according to claim 6, wherein
one of the first housing member and the second housing member includes a locking portion that can be locked to an external locking target.

9. The wiring member fixing body according to claim 1, wherein
one of the first housing member and the second housing member includes a restricting portion that presses the flat wiring member in the locked state and restricts movement in the opposing direction.

10. The wiring member fixing body according to claim 9, wherein
one of the first housing member and the second housing member includes a locking portion that can be locked to an external locking target.

11. The wiring member fixing body according to claim 1, wherein
one of the first housing member and the second housing member includes a locking portion that can be locked to an external locking target.

12. The wiring member fixing body according to claim 1, further comprising:
another partition wall located between and separating the first housing space portion and the another second housing space portion, wherein
the first housing space portion is located between the second space portion and the another second space portion,
the second housing space portion houses at least one of the other wiring members
the another second housing space portion houses a different one of the other wiring members, and
the different one of the wiring members passes through the fixing body.

* * * * *